(12) United States Patent
Kwon et al.

(10) Patent No.: US 6,445,925 B1
(45) Date of Patent: Sep. 3, 2002

(54) METHOD FOR SETTING A LOCATION REGISTRATION ZONE

(75) Inventors: Jae-yeong Kwon; Pyeong-hwan Wee, both of Seoul (KR)

(73) Assignee: Samsung Electronics, Co., Ltd. (KR)

( * ) Notice: Subject to any disclaimer, the term of this patent is extended or adjusted under 35 U.S.C. 154(b) by 0 days.

(21) Appl. No.: 09/261,409

(22) Filed: Mar. 3, 1999

(30) Foreign Application Priority Data

Mar. 6, 1998 (KR) ............................................. 98-7527

(51) Int. Cl.⁷ ................................................. H04Q 7/20
(52) U.S. Cl. ........................ 455/446; 455/435; 455/453
(58) Field of Search ................................ 455/435, 446, 455/447–453, 422, 423, 432–434

(56) References Cited

U.S. PATENT DOCUMENTS

| | | | |
|---|---|---|---|
| 5,305,466 A | 4/1994 | Taketsugu | 455/33.1 |
| 5,379,451 A | 1/1995 | Nakagoshi et al. | 455/54.2 |
| 5,406,614 A | 4/1995 | Hara | 379/59 |
| 5,588,043 A | 12/1996 | Tiedemann, Jr. et al. | 379/63 |
| 5,642,398 A | 6/1997 | Tiedemann, Jr. et al. | 379/57 |
| 5,666,652 A | 9/1997 | Lin et al. | 455/435 |
| 6,058,308 A * | 5/2000 | Kallin et al. | 455/432 |
| 6,138,025 A * | 10/2000 | Lee et al. | 455/453 |
| 6,233,449 B1 * | 5/2001 | Glitho et al. | 455/423 |

OTHER PUBLICATIONS

C.L I, G. P. Pollini, R. D. Gitlin, "Optimum Location Area Sizes and Reverse Virtual Call Setup in PCS networks", Proc. of IEEE, 1995, pp. 140–144.*

K. Kim, M. Cho, Y. Han, K. Cho, K. Han, "Analysis of Power UP and Down Registration in CMS (CDMA Mobile Systems)", Proc. of IEEE, 1995, pp. 329–333.*

M. Kwag, "Analysis of Call Processing Capacity of Base Station in CDMA Cellular Network", Proc. of IEEE, 1999, pp. 1278–1282.*

* cited by examiner

*Primary Examiner*—Nguyen T. Vo
*Assistant Examiner*—Duc Nguyen
(74) *Attorney, Agent, or Firm*—Dilworth & Barrese, LLP (57) ABSTRACT

A method is disclosed for establishing a location registration zone in a code division multiple access (CDMA) system. This method comprises the steps of calculating a paging load and a registration load for a mobile station in a specific test area, calculating the summation of the paging load and registration load, determining the number of base stations in order to minimize the summation of the paging load and registration load and setting a location registration zone in the test area.

10 Claims, 9 Drawing Sheets

METHOD FOR SETTING A LOCATION REGISTRATION ZONE

FIELD OF THE INVENTION

The present invention relates generally to a mobile radio telephone network system and, in particular, to a method for establishing an optimal registration zone in a code division multiple access (CDMA) system.

DESCRIPTION OF THE RELATED ART

In the IS-95 CDMA system, a mobile telecommunication system comprises a plurality of base transceiver stations (BTS) providing communication service and a plurality of mobile stations (MS) served therefrom.

A CDMA system currently in operation in South Korea further comprises base station controllers (BSC) for controlling the BTSs, a base station manager system (BSM) for managing the BSCs, a mobile switching center (MSC) for connecting the BTSs to a public switched telephone network (PSTN), and a home location register (HLR) connected to the MSC for managing the service state of the mobile stations.

The BTSs are connected to the conventional public switched telephone network (PSTN). Mobile stations (MS) within a cell establish a radio channel to communicate with a BTS serving that cell. A forward channel is established from a BTS to a mobile station and a reverse channel is established from a mobile station to a BTS.

A mobile station (MS) and a BTS communicate both voice and data via the forward and reverse traffic channels. On the forward link, IS-95 defines four logical channels: pilot, paging, sync and traffic channels. The channels, with the exception of the traffic channel, are collectively referred to as an overhead channel. Each BTS and mobile station (MS) determine whether to receive data from one another based on the pilot or paging channel transmitted as part of the overhead channel.

The number of frequencies to be assigned to each BTS is predetermined as a function of the system capability and each BTS uses the assigned frequencies as needed. An assigned frequency channel is referred to as a frequency assignment (FA). The CDMA system has several access channels per frequency assignment (PA) by differing codes such as frequency option and sequence. Access channels are considered a part of overhead.

Figure 1:
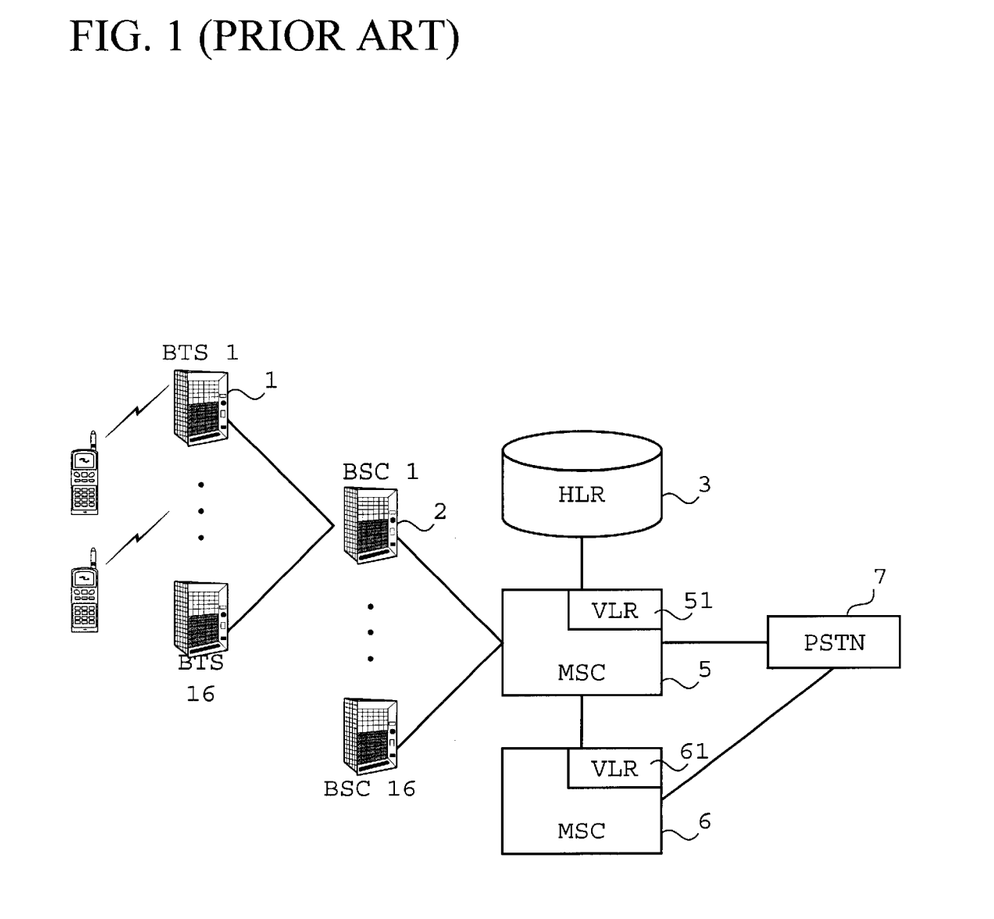
FIG. 1 is a block diagram illustrating a network of a conventional digital communication system (DCS) in accordance with the prior art.

FIG. 1 is a block diagram illustrating a network of a conventional digital communication system (DCS). As illustrated, the network has a plurality of base transceiver stations (BTS) 1, a plurality of base station controllers (BSC) 2, mobile switching centers (MSC) 5 and 6, each MSC having a database associated therewith 51 and 61, the databases for storing information about subscribers transmitted from the HLR, a home location register (HLR) 3 and a public switched telephone network (PSTN) 7.

Figure 2:
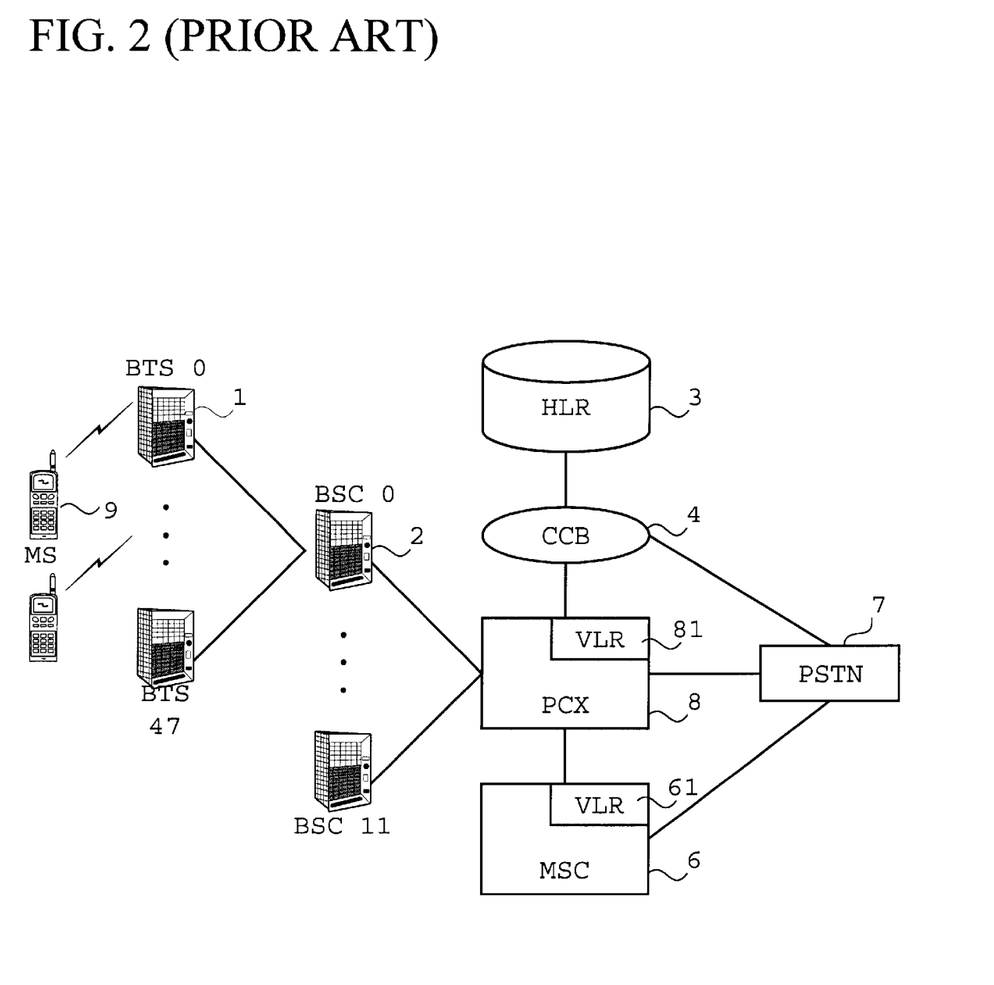
FIG. 2 is a block diagram of a conventional personal communication service system (PCS) in accordance with the prior art.

FIG. 2 is a block diagram illustrating a network of a conventional personal communication service system (PCS). As illustrated, the network comprises a plurality of base transceiver stations (BTS) 1 for providing communication service to mobile stations 9, a plurality of base station controllers (BSC) 2 for controlling the BTSs, private communication exchange (PCX) 8 for connecting a call via the BSC 2, and a public switched telephone network (PSTN) 7 for connecting a plurality of PCXs.

In a two-way communication system, as exemplified by FIGS. 1 and 2, the coverage area is often divided into smaller regions or zones where each zone is a group of one or more cells (i.e., base stations) treated as a unit. Several parameters such as paging, location registration and handoff are used to establish a location registration zone in the mobile telecommunication system. Among these parameters, paging load and location registration are important. The paging load is generated by paging each subscriber from the network and the location registration is required when a subscriber moves.

Paging is a process by which a BSC calls a moving subscriber to deliver an incoming call. For effective paging, timely location registration is also required. Location registration is the process by which a mobile station makes its presence known to a base station (BTS) to facilitate call delivery.

When a roaming mobile station does not register its location, a BTS requires a large number of paging loads to page the mobile station. At the other extreme, when the mobile station frequently registers its location, the base station (BTS) requires a large number of registration loads with the coincident effect that the base station (BTS) reduces its paging load requirement by providing accurate location information to the mobile station.

Consequently, a need exists for setting an optimal balance between paging load and registration load in setting a location registration zone of mobile stations.

Prior art analog networks are negligibly affected by a paging load, in that analog networks establish a location registration zone as a mobile switching center unit independent from the paging load.

However, by contrast, mobile telecommunication networks incorporating CDMA network are required to establish a location registration zone in consideration of both the paging load and the registration load requirements. In a mobile telecommunication network incorporating code division multiple access (CDMA), subscriber count and telephone traffic per subscriber is higher in comparison with an analog network, and as such the paging load is higher in comparison with an analog network.

SUMMARY OF THE INVENTION

It is therefore an object of the present invention to provide a method for setting a location registration zone in consideration of the registration load and a paging load requirement in a code division multiple access network.

In a preferred embodiment of the present invention, a method for setting a location registration zone in a code division multiple access system comprises the steps of: calculating a paging load for a mobile station in a specific test area, calculating a registration load for a mobile station in said test area, calculating the summation of said calculated paging load and registration load and determining an optimal number of base transceiver stations required to minimize said calculated summation and setting a location registration zone corresponding to a coverage area defined by said optimal number of base station transceivers.

BRIEF DESCRIPTION OF THE DRAWINGS

Those objects and other objects, features, aspects and advantages of the present invention will become more apparent from the following detailed description of the present invention when taken in conjunction with the accompanying drawings, in which.

DETAILED DESCRIPTION OF THE PRESENT INVENTION

One embodiment of the present invention estimates the number of subscribers per cell, sets parameters associated with a traffic estimate and analyzes registration load and paging load requirements within a radio section as a function of the number of base station controllers utilized, so that an optimal number of base stations controllers may be found which minimizes both the registration load and paging load. The radio section may be defined as an area where radio communication is provided, specifically where paging occurs.

To determine an optimal number of BSCs, the method of the present invention performs two calculations, a first calculation for determining a paging load, and a second calculation for determining the registration load. Subsequent to performing the respective calculations the results are summed. The method of the present invention determines an optimal number of base station transceivers (BTSs) to minimize the sum of the paging load and registration load. The following describes a presently preferred embodiment for calculating the paging load and registration load.

Paging Load Calculation

A method for calculating a paging load within a radio section will be described. A radio section may be generally defined as a region where radio communication is provided, and more specifically a region where paging is used. The paging load relates to the frequency of call transactions and the amount of information per call transaction, which is equal to the paging frequency multiplied by the amount of information (# of bytes) used in each paging transaction. Thus, the paging load $L_P$ is preferably computed as follows;

$$L_P = A \times P_S + B \times P_u + C \times R_R \qquad \text{Equation 1}$$

where
- A corresponds to bytes of information per responsed paging,
- B corresponds to bytes of information per non-responsed paging,
- C corresponds to bytes of information per response to location registration,
- $P_S$ denotes the frequency of response to paging,
- $P_u$ denotes the frequency of non-response to paging, and
- $R_R$ denotes the frequency of response to location registration.

The frequency of response to paging $P_S$ of Equation 1 is computed as follows;

$$P_S = L_{bb} \times P_P 1 - \frac{(1 - P_P)^M}{P_P} \qquad \text{Equation 2}$$

where
- $L_{bb}$ is the frequency of mobile station termination call per subscriber
- $L_{bb}$ is calculated by multiplying a ratio of termination call by a busy hour call attempt (BHCA), which varies depending upon a standard of living of each country.
- $P_P$ is a probability of response of subscriber per paging, denoting a ratio of response to paging.
- $M_P$ is the number of resending times of a paging message, denoting the frequency of re-transmission of a paging message from a BTS to no-response subscriber in a radio section.

The frequency of non-response to paging, $P_U$ of Equation 1 is computed as follows:

$$P_u = L_{bb} \times (M_S - P_P) 1 - \frac{(1 - P_P)^{M_P}}{P_P} \qquad \text{Equation 3}$$

where
- $M_S$ is the number of cells within a location registration zone, or equivalently the number of base station controllers.

The frequency of response to registration, $R_R$ of Equation 1 is calculated as follows:

$$R_R = R_S \qquad \text{Equation 4}$$

where
- $R_S$ is the frequency of registration per subscriber.

Registration Load Calculation

A method for calculating a registration load in a radio section will be described.

If mobile station density in a service area in a mobile telecommunication system is supposed to be equally distributed, the frequency of a vehicle escaping from each service area, $U_{1a}$ is computed as:

$$U_{1a} = V \times \frac{L}{\pi} \qquad \text{Equation 5}$$

and the frequency of registration per subscriber, $R_S$ is computed as follows:

$$R_S = U_{1a} \times \frac{a}{N} + \text{POWER ON/OFF} \qquad \text{Equation 6}$$

where
- V denotes the amount of the traffic,
- L denotes the length of circumference of a location registration zone,
- α is a ratio of vehicles having a mobile station,
- N is the number of subscribers within a location registration zone, and
- POWER ON/OFF indicates whether registration is a power-up registration or power-down registration according to the power on/off.

When the frequency of registration per subscriber, $R_S$ is defined as stated in Equation 6, a registration load, $L_R$ is calculated as follows:

$$L_R = R_S \times b \qquad \text{Equation 7}$$

where b denotes a load per registration.

A method for location registration in a national mobile telecommunication system may be divided into autonomous location registration and non-autonomous location registration. With autonomous registration a mobile station will register without an explicit command from the base station. Power-up registration, a power-down registration, a zone-based registration, distance-based registration, timer-based registration are all forms of type registration. By contrast, ordered registration is a type of non-autonomous autonomous registration. Eqn. 7 above calculates an autonomous registration load requested by a mobile station. By contrast, non-autonomous registration load need not be calculated because the system can calculate the load for itself.

ILLUSTRATIVE EXAMPLE

A. DCS System Parameters

With regard to a digital communication system (DCS), assume, for example, that each BTS provides communication service to 1,500 users.

Assume the following dimensions: a test area, 44 km×44 km, a mobile switching center (MSC), 22 km×22 km, and a BSC, 5.5 km×5.5 km. Assume further that each MSC has 16 BSCs, and each BSC has 9 BTSs. Also, a busy hour call attempt (BHCA) is 1.8, an average call duration time is 67 seconds, $L_{bb}$, the frequency of terminating call is 0.648, and a ratio is 36%. A unit traffic is 48,000 per km, and a ratio of vehicles having a mobile station is 20%.

B. PCS System Parameters

With regard to a personal communication service system (PCS), assume each BTS provides communication service to 700 users.

Assume the following dimensions: a test area, 44 km×44 km, a mobile switching center (MSC), 22 km×22 km, and a BSC, 5.5 km×5.5 km. Each MSC has 8 BSCs, and each BSC has 24 BTSs. Also, a busy hour call attempt (BHCA) is 1.6, an average call duration time is 78.75 seconds, $L_{bb}$, the frequency of terminating call is 0.52, and the ratio is 32.5%. A unit traffic is 48,000 per km, and a ratio of vehicles having an associated mobile station is 20%.

C. PCS and DCS System Parameters

With reference to both the DCS and PCS systems described above, subscriber information per responded paging, A, is 23.4 bytes and information of subscribers per non-responded paging, B, is 13.4 bytes, and subscriber information per response to paging, C, is. 8 bytes.

$P_P$ a ratio of response to paging is 29%. $M_P$, the number of times a paging message is repeated is determined to be 2 in the case where the ratio of response, $P_P$ is 50%. Further, the number of cells within a location registration zone grows in proportion to the number of BSCs. Also, the number of cells within a location registration zone grows in proportion to the number of BSCs. That is , with specific reference to a DCS system , a single BCS manages 9 BTSs, therefore, each additional BSC corresponds to the addition of 9 additional BTSs. As such, the BTS count grows as 9,18,36,72, 144, etc. With reference to a PCS system, the BTS count grows as 24, 48, 72, 96, 120, 144, etc. for each additional BSC. Using the aforesaid assumptive values, a paging load, $L_P$ may be expressed as:

$$L_P = 11.92\ M_S + 8R_S + 2.55 \text{(byte)} \qquad \text{Equation 8}$$

The calculated paging load has units of byte/hr/term. Table 1 illustrates the paging load within a radio section for a (DCS) system as a function of the number of cells (i.e. BSCs).

TABLE 1

| Location Zone | 1BSC | 2BSC | 4BSC | 8BSC | 16BSC |
|---|---|---|---|---|---|
| Paging load (byte/time/area) | 182 | 304 | 560 | 1088 | 2151 |

Figure 3:
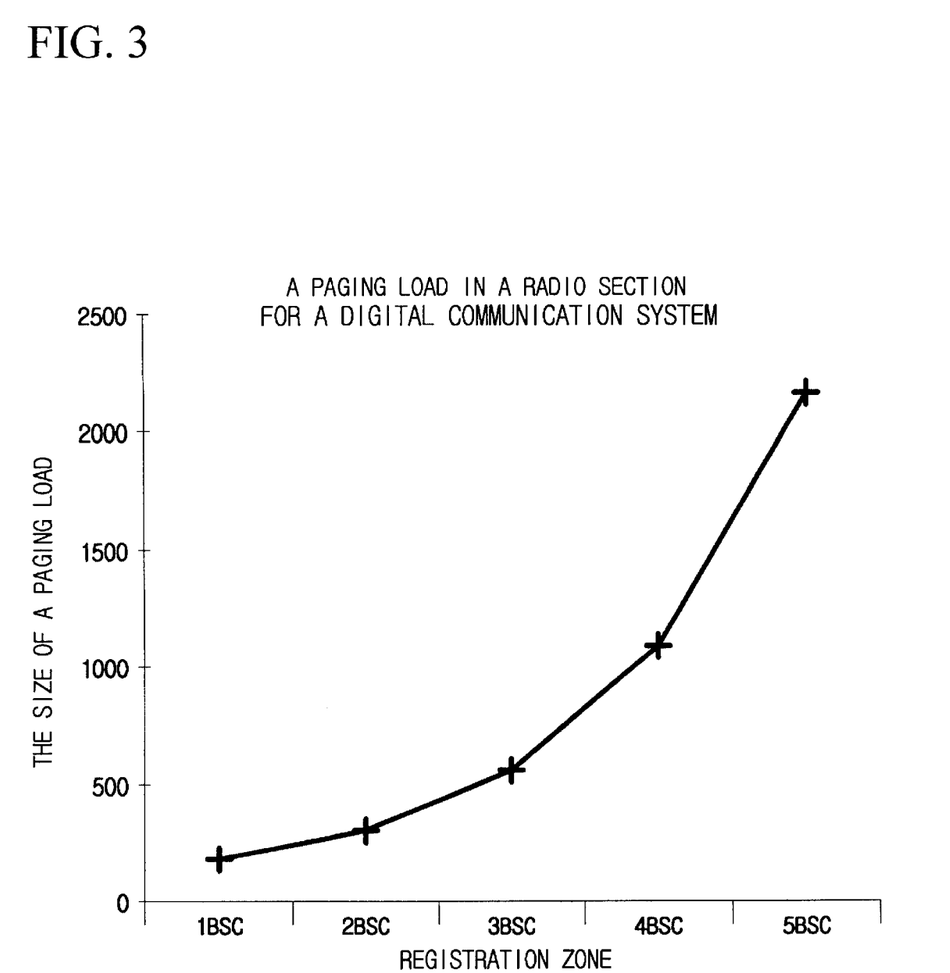
FIG. 3 is a graph illustrating the paging load based on the values in Table 1.

FIG. 3 is a graph illustrating the paging load based on the values in Table 1. Table 2 describes a paging load within a radio section for a personal communication service system as a function of the number of cells (i.e., BSCs).

TABLE 2

| | Location Zone | | | | | | | |
|---|---|---|---|---|---|---|---|---|
| | 1BSC | 2BSC | 3BSC | 4BSC | 5BSC | 6BSC | 7BSC | 8BSC |
| Paging load | 321 | 599 | 882 | 1163 | 1449 | 1732 | 2019 | 2303 |

Figure 4:
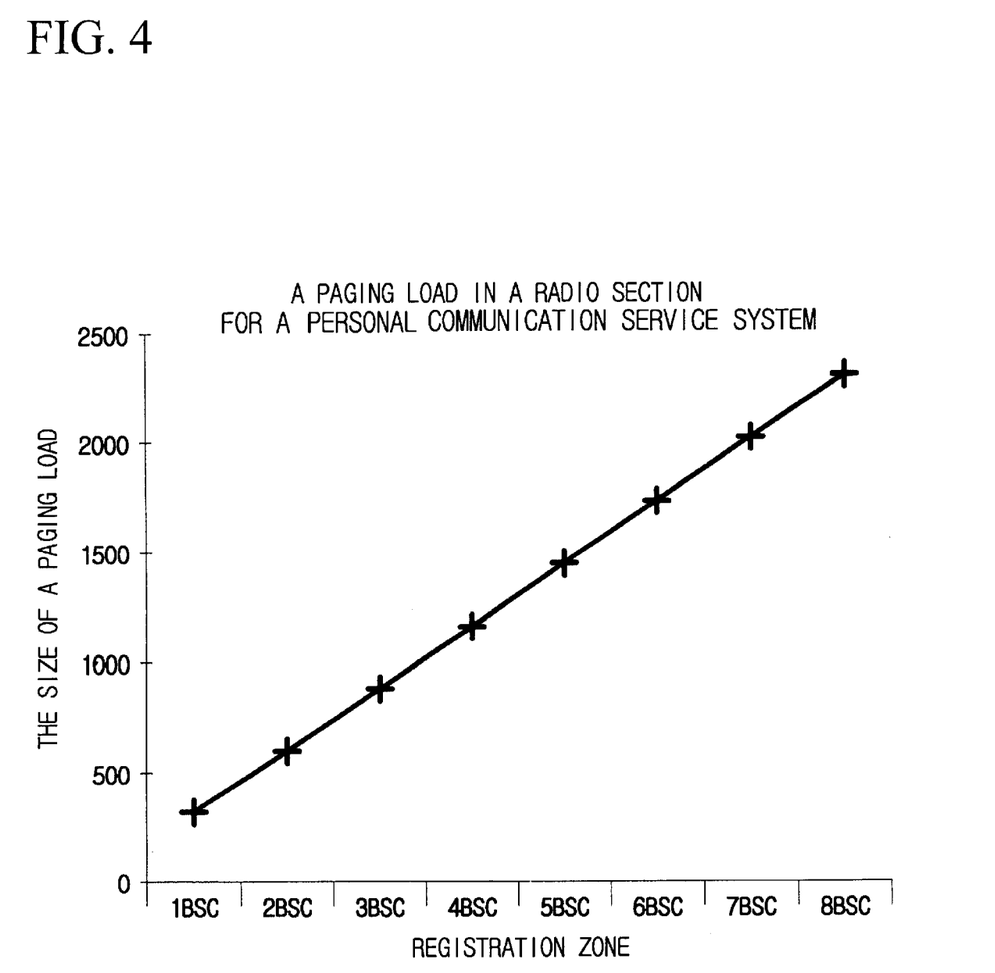
FIG. 4 is a graph illustrating the paging load based on Tabled 2 for a personal communication service system.

FIG. 4 is a graph illustrating the paging load based on Table 2 for a personal communication service system (PCS) as a function of the number of cells (i.e BSCs).

The registration load for both the digital communication system and personal communication service system is computed by using equation 6. The registration load calculations assume the system configuration previously described is employed herein in order to compare the registration load with the paging load. A load per registration b (i.e., the size of the registration request message) is variable and is set to the maximum permitted value in order to calculate the maximum registration load at each location area.

The choice of power-up registration or power-down registration is not relevant to the present embodiment because it is a characteristic of a mobile station and as such, does not change unexpectedly.

A registration load for a DCS system is described in Table 3 as a function of the number of cells (i.e., BSCs).

TABLE 3

| Location Zone | 1BSC | 2BSC | 4BSC | 8BSC | 16BSC |
|---|---|---|---|---|---|
| Registration load per 1 subscriber | 1277 | 958 | 639 | 479 | 307 |

Figure 5:
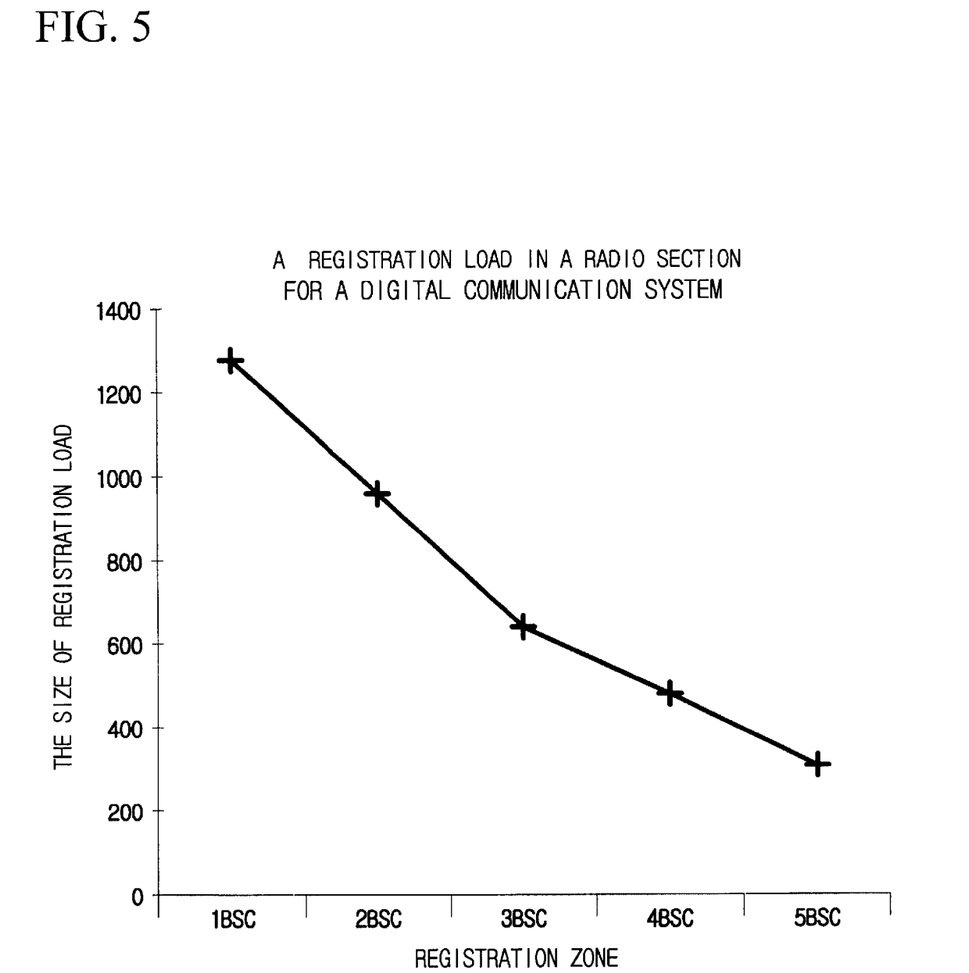
FIG. 5 is a graph illustrating a registration load within a radio section for a DCS system based on values illustrated in Table 3.

FIG. 5 is a graph illustrating a registration load within a radio section for a DCS system based on values illustrated in Table 3.

Table 4 illustrates a registration load within a radio section for a personal communication system (PCS).

TABLE 4

| | \multicolumn{8}{c}{Location Zone} | | | | | | | |
|---|---|---|---|---|---|---|---|---|
| | 1BSC | 2BSC | 3BSC | 4BSC | 5BSC | 6BSC | 7BSC | 8BSC |
| Registration load per 1 subscriber | 914 | 684 | 593 | 456 | 456 | 381 | 388 | 342 |

Figure 6:
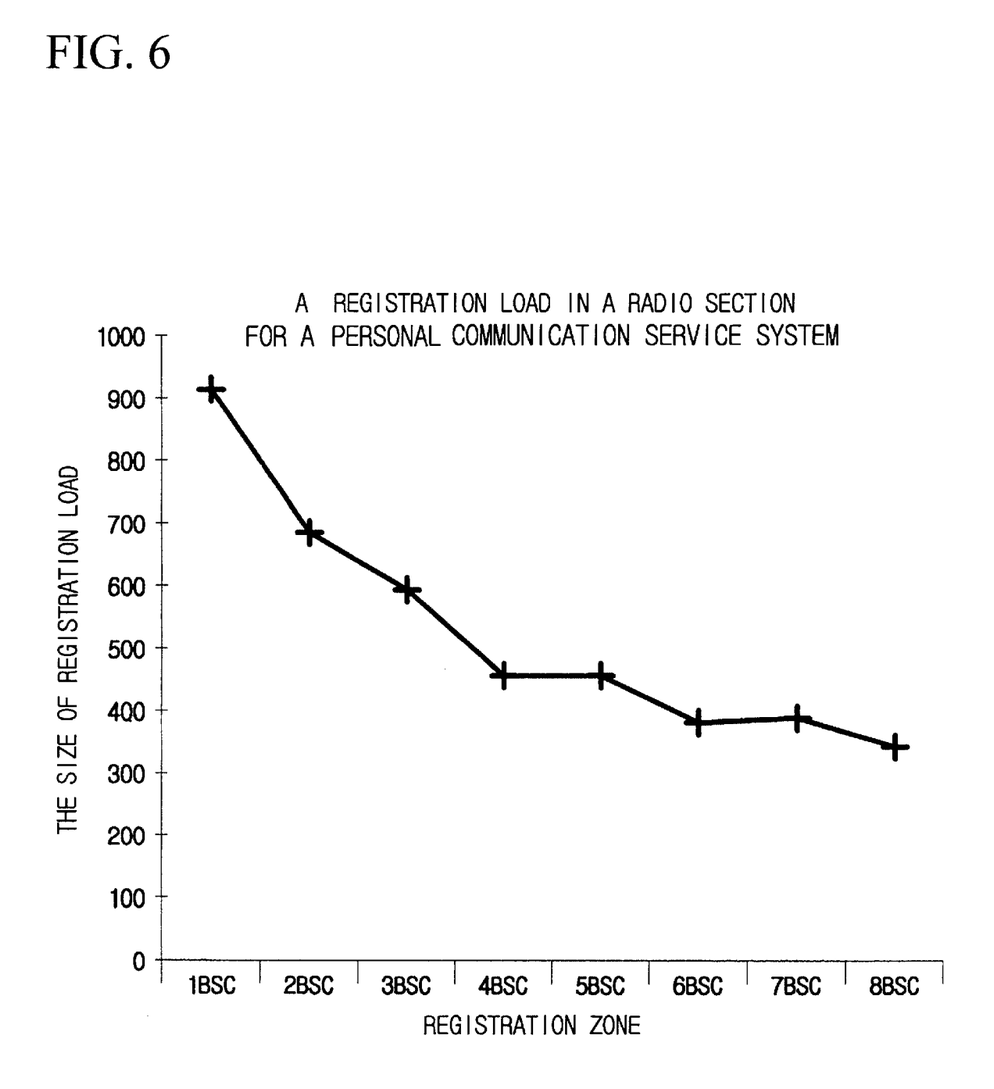
FIG. 6 is a graph showing registration load in a radio section for a PCS system based on Table 4.

FIG. 6 is a graph showing registration load in a radio section for a PCS system based on Table 4. The summation of the paging load and registration load corresponds to a summation load in a radio section.

Figure 7:
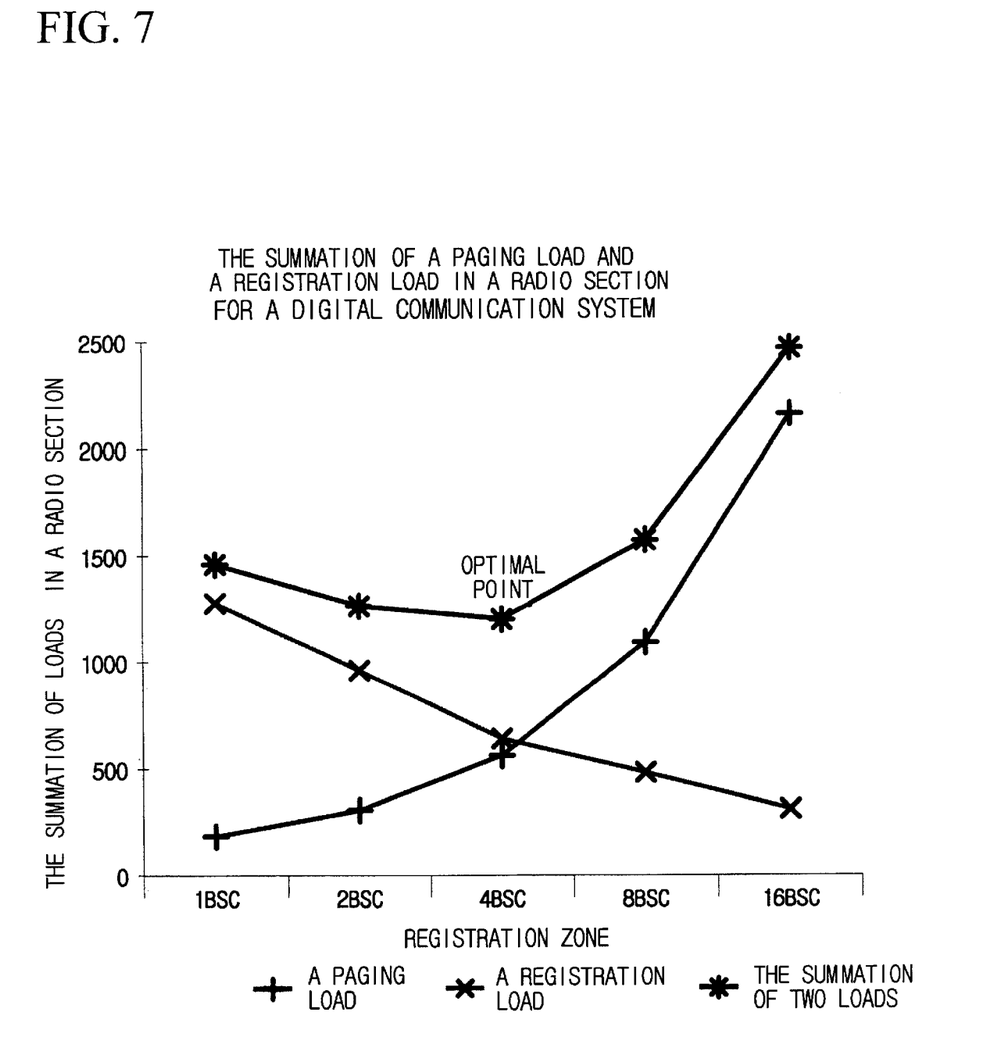
FIG. 7 is a graph showing the summation of loads in a radio section for a DCS system.

FIG. 7 is a graph showing the summation of loads in a radio section for a DCS system. As shown, the location with the minimal summation of paging load and registration load is associated with 4 BSCs, which is determined to be the optimal point. Therefore, for a DCS system, because a single BSC controls 9 BTSs, it is most desirable to establish 36 BTSs in a corresponding test area and set up the location area.

Figure 8:
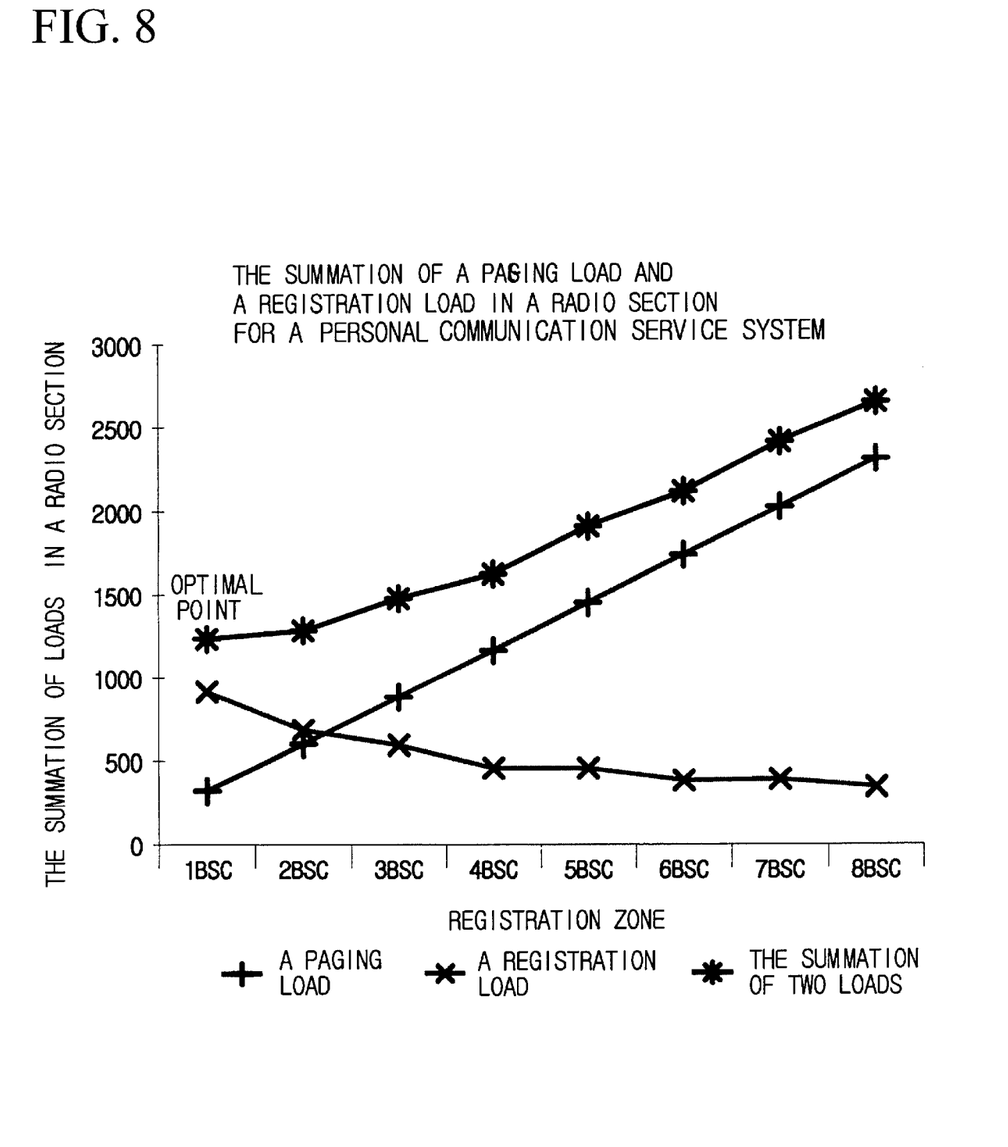
FIG. 8 is a graph showing the summation of loads in a radio section for a PCS system.

FIG. 8 is a graph showing the summation of loads in a radio section for a PCS system. As shown, the location with the minimal summation of paging load and registration load is 1 BSC, which is determined to be the optimal point. Therefore, for a PCS system, it is most desirable to establish 24 BTSs in a corresponding test area.

Figure 9:
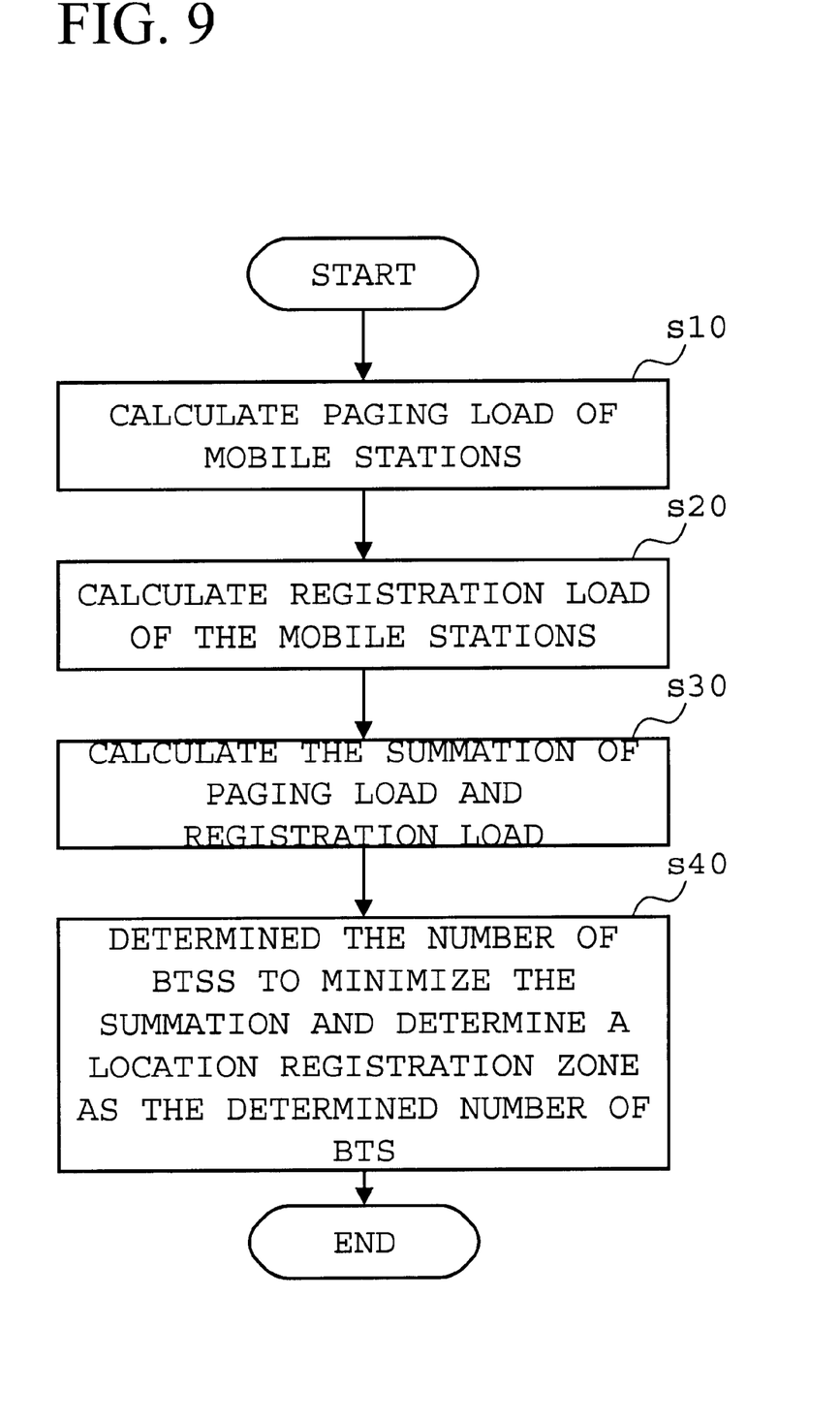
FIG. 9 is a flowchart illustrating a method for setting a location registration zone.

FIG. 9 is a flow chart to illustrate a method for setting a location registration zone in a code division multiple access (CDMA) system. As illustrated, a paging load of a mobile station is calculated in step (s10), and a registration load is calculated in step (s20). The summation of the calculated paging load and registration load is calculated in step (s30). In step (s40), the number of BTSs is determined to minimize the summation of the calculated loads, such that a location registration zone is established.

While the invention is susceptible to various modifications and alternative forms, specific embodiments thereof have been shown by way of example in the drawings and detailed description. It should be understood, however, that the present invention is not limited to the particular forms disclosed, but on the contrary, the intention is to cover all modifications, equivalents, and alternatives falling within the spirit and scope of the invention as defined by the appended claims.

What is claimed is:

1. A method for setting a location registration zone in a code division multiple access system, said system including mobile stations and base transceiver stations, the method comprising the steps of:

calculating a paging load for a mobile station in a specific test area, wherein said paging load, $L_p$ is calculated as $$L_P = A \times P_S + B \times P_u + C \times R_R,$$

where A defines the amount of subscriber information per responded paging, B defines the amount of subscriber information per non-responsed paging, C defines the amount of subscriber information per response to registration, $P_S$ defines the frequency of response to paging, $P_u$ defines the frequency of non-response to paging, and $R_R$ defines the frequency of response to registration;

calculating a registration load for a mobile station in said test area;

calculating the summation of said calculated paging load and registration load; and determining an optimal number of base transceiver stations required to minimize said calculated summation and setting a location registration zone corresponding to a coverage area associated with said optimal number of base station transcievers.

2. The method for setting a location registration zone as set forth in claim 1, wherein said A, B and C are in units of bytes.

3. The method for setting a location registration zone as set forth in claim 1, wherein said frequency of response to paging, $P_S$ is calculated by $$P_S = L_{bb} \times P_P \frac{1 - (1 - P_P)^{M_P}}{P_P},$$

where $L_{bb}$ is the frequency of mobile station termination call per subscriber, $P_P$ is a probability of response of a paging subscriber and $M_P$ is the number of resending of resending times of a paging message to non-responding subscriber.

4. The method for setting a location registration zone as set forth in claim 3, wherein said frequency of mobile station termination call per subscriber, $L_{bb}$ is calculated by multiplying busy hour call attempt (BHCA) by a ratio of termination call.

5. The method for setting a location registration zone as set forth in claim 1, wherein said frequency of non-response to paging, $P_u$ is given by $$P_u = L_{bb} \times (M_S - P_P) \frac{1 - (1 - P_P)^M}{P_P},$$

where $L_{bb}$ is the frequency of mobile station termination call per subscriber, $M_S$ is the number of cells within said test area, $P_P$ is a probability of response of a paging subscriber and $M_P$ is the number of resending times of a paging message to non-responding subscriber.

6. The method for setting location registration zone as set forth in claim 5, wherein said frequency of mobile station termination call per subscriber, $L_{bb}$ is calculated by multiplying busy hour call attempt (BHCA) by a ratio of termination call.

7. The method for setting a location registration zone as set forth in claim 1, wherein the frequency of registration per subscriber, $R_S$ is calculated by $$R_S = \frac{U_{1a} \times a}{N},$$

where $U_{1a}$ is the frequency of escaping vehicles, $\alpha$ is a ratio of vehicles carrying a mobile station, N is the number of subscribers within said test area and said frequency of response to said registration, $R_R$ is equal to said $R_S$.

8. The method for setting a location registration zone as set forth in claim 7, wherein said frequency of escaping vehicles, $U_{1a}$ is calculated by $$U_{1a} = V \times \frac{L}{\pi},$$

where V is the amount of telephone traffic within said test area and L is the length of circumference of said test area.

9. The method for establishing a location registration zone as set forth in claim 7, wherein said frequency of registration per subscriber, $R_S$ is calculated in consideration to power-up registration or power-down registration.

10. The method for setting a location registration zone as set forth in claim 1, where said registration load, $L_R$ is calculated by $$L_R = R_S \times b,$$

where $R_S$ denotes the frequency of registration per subscriber and b denotes loads per registration.

* * * * *